US008447360B2

(12) United States Patent  
Garcia Cabezas et al.

(10) Patent No.: US 8,447,360 B2  
(45) Date of Patent: May 21, 2013

(54) SETTING THE RADIATION PATTERN OF AN ANTENNA

(75) Inventors: Javier Garcia Cabezas, Madrid (ES); Francisco Javier Dominguez Romero, Madrid (ES); Carlos Orobitg Morin, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 170 days.

(21) Appl. No.: 12/888,323

(22) Filed: Sep. 22, 2010

(65) Prior Publication Data

US 2011/0070908 A1 Mar. 24, 2011

(30) Foreign Application Priority Data

Sep. 22, 2009 (ES) .................................. 200930717

(51) Int. Cl.
*H04W 4/02* (2009.01)
*H04B 7/00* (2006.01)

(52) U.S. Cl.
USPC ....................................... 455/562.1; 455/517

(58) Field of Classification Search
USPC ....................................... 455/453, 507, 562.1
See application file for complete search history.

(56) References Cited

U.S. PATENT DOCUMENTS

| 5,818,385 | A | * | 10/1998 | Bartholomew | 455/456.6 |
| 6,236,866 | B1 | * | 5/2001 | Meyer et al. | 455/562.1 |
| 6,529,745 | B1 | * | 3/2003 | Fukagawa et al. | 455/562.1 |
| 6,970,721 | B1 | * | 11/2005 | Gnesda et al. | 455/562.1 |
| 2006/0068849 | A1 | | 3/2006 | Bernhard et al. | |
| 2006/0223546 | A1 | * | 10/2006 | Claussen | 455/456.1 |
| 2006/0239224 | A1 | | 10/2006 | Borst et al. | |
| 2008/0096566 | A1 | * | 4/2008 | Brunner et al. | 455/437 |
| 2009/0286547 | A1 | * | 11/2009 | Tangemann | 455/452.2 |

FOREIGN PATENT DOCUMENTS

| EP | 1120983 | | 8/2001 |
| EP | 1 307 066 | | 5/2003 |
| GB | 2307142 | | 5/1997 |
| GB | 2307142 | A * | 5/1997 |
| WO | WO 9917576 | | 4/1999 |
| WO | WO 9960659 | | 11/1999 |
| WO | WO 2007086784 | | 8/2007 |
| WO | WO 2008016944 | | 2/2008 |

OTHER PUBLICATIONS

Application No. 200930717, Mail Date Sep. 22, 2009, Spanish Search Report.

* cited by examiner

*Primary Examiner* — Meless N Zewdu
*Assistant Examiner* — Tangela T. Chambers
(74) *Attorney, Agent, or Firm* — Workman Nydegger

(57) ABSTRACT

The invention refers to a method for dynamically setting the radiation pattern of an antenna of a base station connected to User Equipments in a cellular telecommunications network by obtaining data of the positions of User Equipments located under coverage of the base station during a predetermined period of time; statistically treating said data of the positions of User Equipments to obtain at least one statistical parameter of said data, and changing the radiation pattern of the antenna depending on the result of comparing said at least one statistical parameter with a pre-established value.

18 Claims, 4 Drawing Sheets

SETTING THE RADIATION PATTERN OF AN ANTENNA

CROSS-REFERENCE AND RELATED APPLICATIONS

This application claims priority to and the benefit of Spanish Patent Application No. ES P200930717, filed on Sep. 22, 2009, which is hereby incorporated by reference in its entirety.

FIELD

Embodiments of the present invention relate to the telecommunications sector and, particularly, in the industrial area engaged in providing Radio Access Networks (RANs) with elements of cellular infrastructures such as Radio Network Controllers (RNCs) Base Station Controllers (BSCs) and Base Stations or Nodes B for wireless communications systems.

More specifically, embodiments are related to the adjustment of the cell range in such networks.

BACKGROUND

As shown in FIG. 1, the down-tilt of an antenna 10 is defined as the angle 11 between an imaginary horizontal line 12 traced from the top of the antenna and the direction 13 of the main lobe 14.

If said down-tilt angle is too low, then the antenna can provide coverage in an area located at considerable distance from the base station site; but, there is a risk of having more interference with the rest of base stations, and also there is risk of dropped call due to non-defined neighbour cells.

On the other hand, if the down-tilt angle is too high, the coverage of the cell can be too small, causing the rest of the neighbouring cells to carry too much traffic, thereby unbalancing the network load.

One of the problems in the optimization task in current networks is how to adjust the down-tilt of the antenna in order to provide an optimum coverage of the area covered by the base station where such antenna is located.

Several approaches aim at optimizing the area covered by a site, and include the possibility of adjusting the down-tilt angle of the base station antenna in order to do so.

For example, US 2006/0239224-A1 discloses a method of configuring a cell of a wireless communication system, in which a base station adjusts its access area so as improve resource utilization. It is dynamic method that responds in real time to traffic fluctuations. So the access area of the base station is adjusted selected on a traffic-based criterion.

Also, EP-1307066 discloses a method of optimizing the down-tilt angle of the antenna beam based on geometric data relating to the relative positions and orientations of base stations in a cellular network, and also based on measurements reports from mobile stations active with cells served by such base stations.

US 2006/0068849-A1 describes a method for controlling interference in CDMA networks which includes adjusting the coverage areas of a cell based on traffic load of the cells.

SUMMARY OF EXAMPLE EMBODIMENTS

Disclosed embodiments relate to methods of dynamically setting the radiation pattern of a base station antenna.

None of the above documents disclose the possibility of optimizing the access area of the cell covered by a base station based on a statistical criterion of the number and positions of user equipments served by said base station.

Disclosed embodiments are directed to implementations that provide an optimum communication service environment by varying the down-tilt angle of the antenna in a base station, based on the statistics positioning of the User Equipments under coverage of such base station.

A first embodiment relates to methods for dynamically setting the radiation pattern of an antenna of a base station connected to User Equipments in a cellular telecommunications network, comprising:

obtaining data of the positions of User Equipments located under coverage of the base station during a predetermined period of time;

statistically treating said data of the positions of User Equipments to obtain at least one statistical parameter of said data;

changing the radiation pattern of the antenna depending on the result of comparing said at least one statistical parameter with a pre-established value.

According to one embodiment, the radiation pattern is controlled by means of changing the down-tilt angle of the antenna.

The radiation pattern can also be controlled by means of changing the azimuth angle of the antenna.

The network can obtain the positioning data of the User Equipment through several methods. The more accurate the positioning data of the User Equipments is, the better the optimisation of the radiation pattern will be.

Preferably said statistical parameter is the proportion or percentile of User Equipments samples outside a pre-established target cell range, and:

if said proportion is higher than a pre-established value, then the down-tilt angle of the antenna is increased by a predetermined amount;

otherwise the down-tilt angle is not changed.

In a disclosed embodiment, a method also includes that:

if said proportion is lower than a pre-established value minus a hysteresis factor, then the down-tilt angle of the antenna is decreased by a predetermined amount;

otherwise the down-tilt angle is not changed.

Said pre-established target cell range is preferably determined as a function of interferences with neighbour cells.

There are several possible ways to obtain the data of positions of the User Equipments, one example being by means of a standard propagation delay method. But it is also possible to obtain such data using a multilateration method, or by means of a GPS unit associated with the User Equipment.

Disclosed embodiments also relate to a network component of a mobile or cellular telecommunications network comprising an antenna and means for changing the radiation pattern of the antenna.

According to another embodiment, the network component further comprises:

means for obtaining at least one statistical parameter representative of collected data of the positions of User Equipments located under coverage of such network component during a predetermined period of time;

wherein said means for changing the radiation pattern of the antenna are configured to change the radiation pattern depending on the result of comparing said at least one statistical parameter with a pre-established value.

Said means for changing the radiation pattern of the antenna are preferably configured to control the down-tilt of the antenna.

Preferably the statistical parameter is the proportion of User Equipments samples outside a pre-established Target Cell Range, and if said proportion is higher than a pre-established value, then the down-tilt angle of the antenna is increased by a predetermined amount; otherwise the down-tilt angle is not changed.

Said statistical parameter can be the proportion of User Equipments samples outside a pre-established target cell range, and if said proportion is lower than a pre-established value minus a hysteresis factor, then the down-tilt angle of the antenna is decreased by a predetermined amount; otherwise the down-tilt angle is not changed.

Said pre-established target cell range is preferably determined as a function of interferences with neighbour cells.

In the context of the present invention, the term "network component" is intended to mean a network entity such as a Base Station, a Node B or eNode B of a mobile communications network.

DETAILED DESCRIPTION OF EXAMPLE EMBODIMENTS

Reference will now be made in detail to a preferred embodiment of the method of the present invention, which for illustrative purposes, but without limitation, is mainly directed to 3G networks.

In 3G networks there are different methods for providing positioning information of the user equipments, UE, such as CellID, CellId+RTT, OTDOA (Observed Time difference of arrival) or AGPS (Assisted GPS).

Due to its accuracy, the preferred way of obtaining the position of the User Equipments is the RTT (round-trip time) information, since it can be implemented easily without mobile special support and it is a measurement already done by the system to synchronise the transmission and reception (it is needed to setup the radio link).

It is also possible to obtain information of the position of the User Equipment if the latter is provided with Global Positioning System (GPS) functionalities. There should also be a specific permission from the user of the User Equipment to be localized.

There are other ways for the user equipment UE to obtain its coordinates, for example, by means of the Galileo system or the Chinese COMPASS which are global positioning systems based on satellites.

It is also possible to obtain the positioning information by means of connecting the UE to other wireless systems such as Wi-Fi or Bluetooth, with servers providing the coordinates of the access points.

In any case, these positioning systems are not in the 3G network. So in order to get the information it needs, the network needs to request that positioning information to the user equipment UE.

This positioning information is obtained by means of any of the above methods. Such positioning information is collected for the different User Equipments located in a cell during a predetermined period of time and stored in a database. The collected information is then statistically processed.

Figure 1:
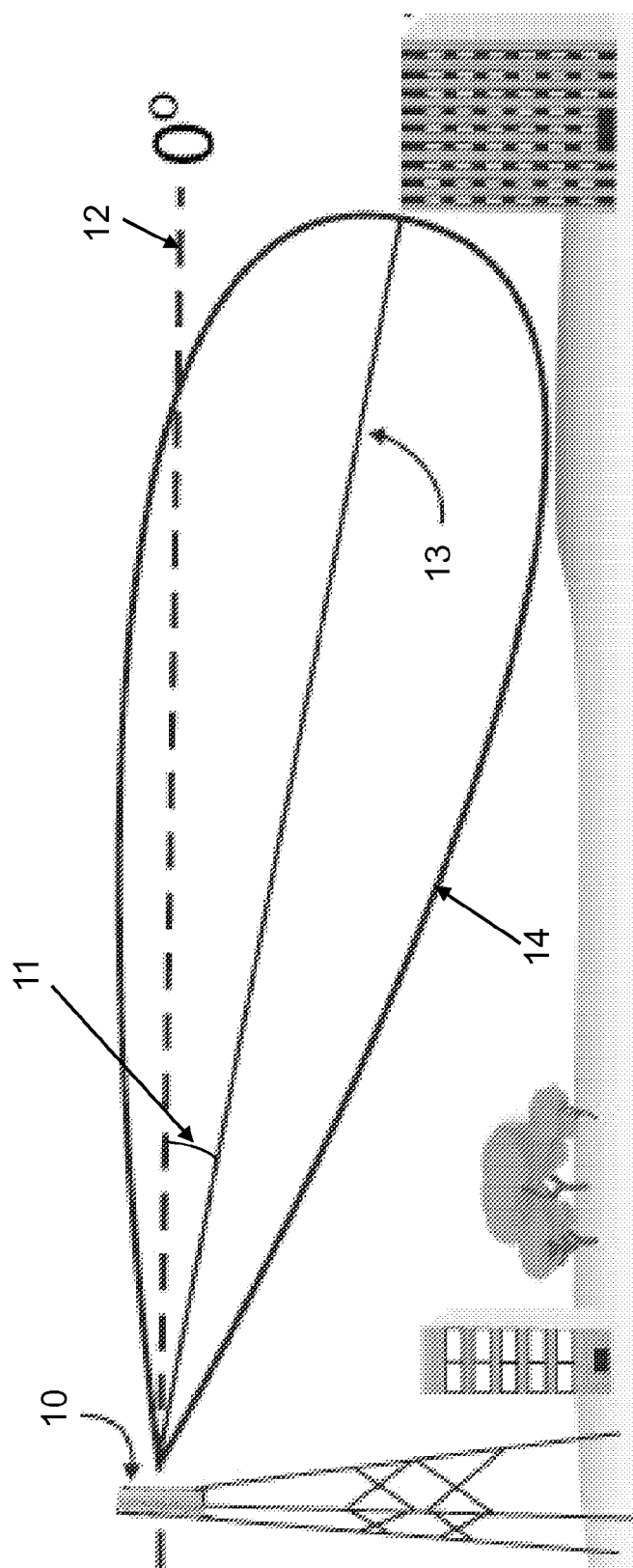
FIG. 1 shows the down-tilt angle of an antenna.
Figure 2:
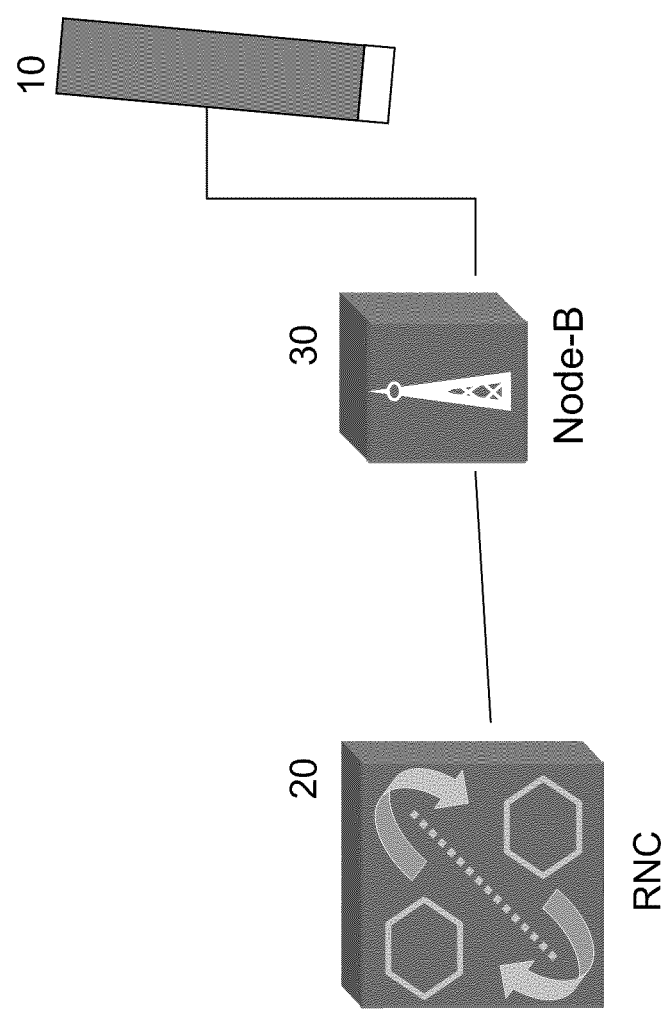
FIG. 2 shows a first possible way of statistically collecting data of User Equipment positions and implementing the invention.
Figure 3:
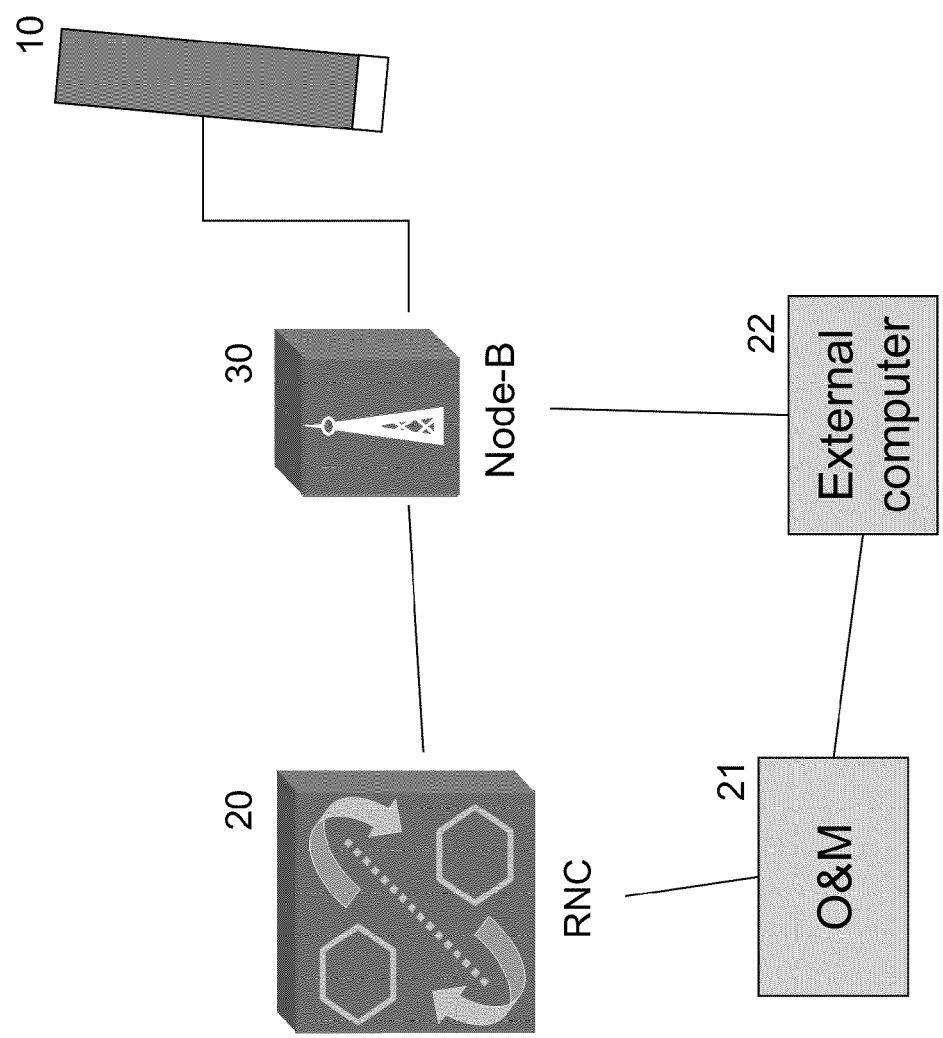
FIG. 3 shows a second possible way of statistically collecting data of User Equipment positions and implementing the invention.

As shown in FIGS. 2 and 3, such statistical process can take place in the radio network or outside the radio network.

In FIG. 2, the Radio Network Controller 20 collects the positioning information, statistically processes it, and sends the corresponding order to change the down-tilt angle of the antenna 10 directly through the Node B 30.

In the case shown in FIG. 3, the positioning information of the User Equipment is collected by the O&M (Operation and Maintenance) system 21 and sent to an external computer 22 where these positioning data is statistically processed. Said external computer is connected to the Node B 30, which in turn changes the down-tilt of the antenna according to the processed data.

Figure 4:
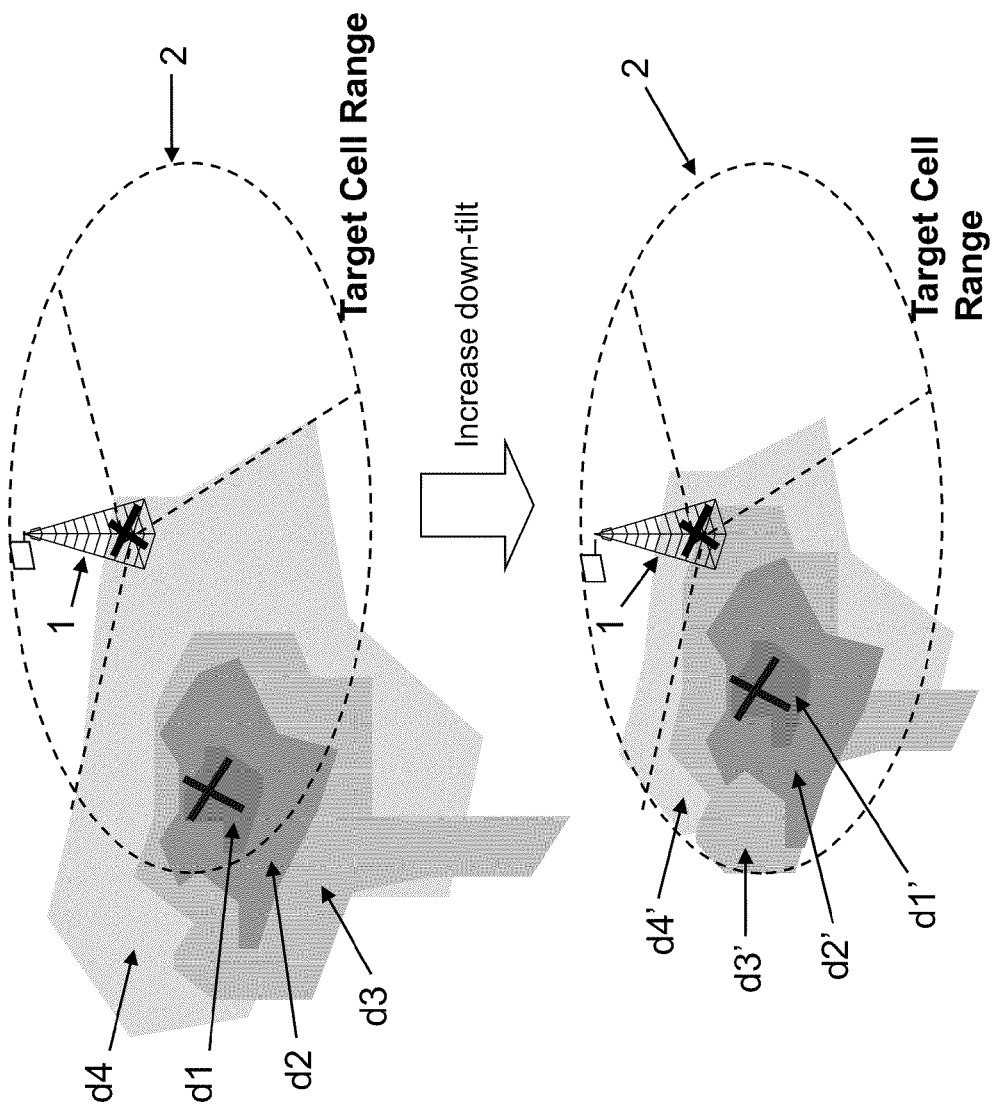
FIG. 4 schematically shows how the proposed method works.

The upper part of FIG. 4 shows the situation in which, for a specific down-tilt angle in the antenna of a Node B 1, the collected statistical data of the positions of the User Equipment connected to said Node B in the previous days (or any other pre-established period of time) shows that the percentage of User Equipment samples located at a distance to the such Node B 1 higher than a desired Target Cell Range 2 is too high (a rough representation of the distribution of the UE positions is shown by shaded areas d1, d2, d3, d4, d1 being the area with the highest concentration of UE equipments, d2 having a smaller concentration of UE equipments and so forth). In view of that statistical data of the UE positions, according to the invention, the down-tilt angle of the antenna in that Node B is increased, and so the same antenna gives coverage in a narrower area. As a result (shown in the lower part of FIG. 4), the following collection of statistical data of the UE positions shows a distribution (shaded portions d1', d2', d3', d4') which is inside the same desired target cell range 2.

In other words, the method of the invention works as follows:

The positioning data of the User Equipments connected to the Node B are collected during X days (X being configurable).

Such data is stored and statistically processed to provide a distribution of the UE position.

And, if the percentile of the UE samples outside a desired Target Cell Range (configurable input) is higher than a pre-established Maximum Percentile, then the down-tilt angle of the corresponding antenna is increased by StepUp degrees. Otherwise, the down-tilt angle is kept as set.

The value of the Target Cell Range is set taking into account possible interferences with neighbour cells, so as to avoid them.

The Maximum Percentile is the maximum % of samples that are allowed to be out of the desired Target Cell Range, and it is also configurable.

StepUp is the number of degrees the down-tilt angle is increased.

There are also a maximum and a minimum down-tilt values which cannot be exceeded.

The decrease of the down-tilt angle is done with the following approach:

If the percentile of the UE samples out of the set Target Cell Range is lower than the Maximum Percentile minus a Hysteresis factor, then the down-tilt will is decreased by StepDown degrees. Otherwise, the down-tilt angle is kept as set.

StepDown is the number of degrees the down-tilt angle is decreased.

Both StepUp and StepDown are configurable parameters.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method for dynamically setting the radiation pattern of an antenna of a base station connected to User Equipments in a cellular telecommunications network, comprising:
    obtaining data of the positions of User Equipments located under coverage of the base station during a predetermined period of time;
    statistically treating said data of the positions of User Equipments to obtain at least one statistical parameter of said data; and
    changing the radiation pattern of the antenna depending on the result of comparing said at least one statistical parameter with a pre-established value,
    wherein said statistical parameter is the proportion of User Equipments samples outside a pre-established target cell range; wherein if said proportion is lower than a pre-established value minus a hysteresis factor, then the down-tilt angle of the antenna is decreased by a predetermined amount, and wherein if said proportion is higher than the pre-established value, then the down-tilt angle of the antenna is increased by a predetermined amount.

2. The method according to claim 1, wherein the radiation pattern is controlled by means of changing the down-tilt angle of the antenna.

3. The method according to claim 2, wherein said pre-established target cell range is determined as a function of interferences with neighbour cells.

4. The method according to claim 1, wherein the radiation pattern is controlled by means of changing the azimuth angle of the antenna.

5. The method according to claim 1, wherein the step of obtaining data of the positions of User Equipments is carried out by means of a standard propagation delay method.

6. The method according to claim 1, wherein the step of obtaining data of the positions of the User Equipments is carried out by means of a multilateration method.

7. The method according to claim 1, wherein the step of obtaining data of the positions of the User Equipments is carried out by means of a Global Positioning System (GPS) unit associated with the User Equipment.

8. A network component of a mobile telecommunications network comprising:
    an antenna;
    means for changing the radiation pattern of the antenna; and
    means for obtaining at least one statistical parameter representative of collected data of the positions of User Equipments located under coverage of such network component during a predetermined period of time;
    wherein said means for changing the radiation pattern of the antenna are configured to change the radiation pattern depending on the result of comparing said at least one statistical parameter with a pre-established value, and
    wherein said statistical parameter is the proportion of User Equipments samples outside a pre-established target cell range; wherein if said proportion is lower than a pre-established value minus a hysteresis factor, then the down-tilt angle of the antenna is decreased by a predetermined amount, and wherein if said proportion is higher than the pre-established value, then the down-tilt angle of the antenna is increased by a predetermined amount.

9. The network component according to claim 8, wherein said means for changing the radiation pattern of the antenna are configured to control the down-tilt of the antenna.

10. The network component according to claim 9, wherein said pre-established target cell range is determined as a function of interferences with neighbour cells.

11. The network component according to claim 8, wherein said means for changing the radiation pattern of the antenna are configured to control the azimuth angle of the antenna.

12. A method for dynamically setting the radiation pattern of an antenna of a base station connected to User Equipments in a cellular telecommunications network, comprising:
    obtaining data of the positions of User Equipments located under coverage of the base station during a predetermined period of time;
    statistically treating said data of the positions of User Equipments to obtain a percentage of User Equipments samples located outside a pre-established target cell range; and
    changing the radiation pattern of the antenna depending on the result of comparing the percentage of User Equipments samples located outside the pre-established target cell range with a pre-established value,
    wherein:
        if the percentage of User Equipments samples located outside the pre-established target cell range is higher than the pre-established value, then a down-tilt angle of the antenna is increased by a predetermined amount,
        if the percentage of User Equipments samples located outside the pre-established target cell range is lower than the pre-established value minus a hysteresis factor, then the down-tilt angle of the antenna is decreased by a predetermined amount, and
        if the percentage of User Equipments samples located outside the pre-established target cell range equals the pre-established value, then there is no change in the down-tilt angle of the antenna.

13. The method according to claim 12, wherein the radiation pattern is controlled by means of changing the down-tilt angle of the antenna.

14. The method according to claim 12, wherein said pre-established target cell range is determined as a function of interferences with neighbour cells.

15. The method according to claim 12, wherein the radiation pattern is controlled by means of changing the azimuth angle of the antenna.

16. The method according to claim 12, wherein the step of obtaining data of the positions of User Equipments is carried out by means of a standard propagation delay method.

17. The method according to claim 12, wherein the step of obtaining data of the positions of the User Equipments is carried out by means of a multilateration method.

18. The method according to claim 12, wherein the step of obtaining data of the positions of the User Equipments is carried out by means of a Global Positioning System (GPS) unit associated with the User Equipment.

* * * * *